United States Patent
Estrada

(10) Patent No.: US 8,855,057 B2
(45) Date of Patent: *Oct. 7, 2014

(54) METHOD AND SYSTEM FOR TRANSFERRING DATA BETWEEN WIRELESS DEVICES

(71) Applicant: Sony Corporation, Tokyo (JP)

(72) Inventor: Andrew Estrada, Escondido, CA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/765,970

(22) Filed: Feb. 13, 2013

(65) Prior Publication Data

US 2013/0148583 A1    Jun. 13, 2013

Related U.S. Application Data

(63) Continuation of application No. 12/687,064, filed on Jan. 13, 2010, now Pat. No. 8,526,363.

(51) Int. Cl.
| | |
|---|---|
| *H04W 4/00* | (2009.01) |
| *H04L 29/06* | (2006.01) |
| *G06F 13/38* | (2006.01) |
| *G06F 13/28* | (2006.01) |
| *G06F 9/54* | (2006.01) |
| *G06F 13/10* | (2006.01) |

(52) U.S. Cl.
CPC .......... *H04L 29/06068* (2013.01); *H04L 69/08* (2013.01); *G06F 13/385* (2013.01); *G06F 13/28* (2013.01); *G06F 9/545* (2013.01); *G06F 2213/3804* (2013.01); *G06F 2213/3814* (2013.01); *G06F 13/102* (2013.01)
USPC ............................ 370/328; 370/392; 370/466

(58) Field of Classification Search
CPC .......................... H04L 29/06068; H04L 69/08
USPC ................. 370/328–329, 389, 392, 400–401, 370/428–429, 432, 465–466, 474–475
See application file for complete search history.

(56) References Cited

U.S. PATENT DOCUMENTS

| | | | | |
|---|---|---|---|---|
| 5,708,659 | A * | 1/1998 | Rostoker et al. | 370/392 |
| 7,307,996 | B2 * | 12/2007 | Forbes et al. | 370/401 |
| 8,170,023 | B2 * | 5/2012 | Rajakarunanayake et al. | 370/392 |
| 2001/0033580 | A1 * | 10/2001 | Dorsey et al. | 370/466 |
| 2004/0022257 | A1 * | 2/2004 | Green et al. | 370/401 |
| 2004/0225720 | A1 * | 11/2004 | Pinkerton | 709/212 |
| 2007/0070986 | A1 * | 3/2007 | Rabenko | 370/352 |
| 2007/0263629 | A1 * | 11/2007 | Cornett et al. | 370/392 |
| 2008/0126578 | A1 * | 5/2008 | Krithivas | 710/4 |
| 2008/0253395 | A1 * | 10/2008 | Pandya | 370/469 |
| 2014/0059155 | A1 * | 2/2014 | Boucher et al. | 709/212 |

* cited by examiner

Primary Examiner — Kevin Mew
(74) Attorney, Agent, or Firm — John L. Rogitz

(57) ABSTRACT

A device for transferring data. The device includes a processor operable to process a header portion of data without processing a payload. Processing the header portion generates a processed header. The processor may signal a direct memory access (DMA) unit to access the payload of the data. As a result, the DMA accesses and passes the payload to a wireless interface for transmission to a destination electronic device based on the processed header. The processor used to process the header portion may be a processor of an electronic device, e.g., a cellular phone, a PDA, etc. Alternatively, the processor may be a processor of a removable memory component. In one embodiment, the processor may be a processor of a module adapted to receive a removable memory and further adapted to couple to an electronic device, e.g., a cellular phone, a PDA, etc., where the removable memory includes its own processor.

20 Claims, 4 Drawing Sheets

METHOD AND SYSTEM FOR TRANSFERRING DATA BETWEEN WIRELESS DEVICES

TECHNICAL FIELD

Embodiments of the present invention relate to the field of electronics. More particularly, embodiments of the present invention relate to a method and system for facilitating data transfer between two electronic devices.

BACKGROUND ART

The use of electronic devices, e.g., cellular phones, cameras, iPods, etc., is prevalent. The increased use of electronic devices has increased the number of applications and the amount of data being transferred between devices. For example, large audio files, image files, videos, etc., are commonly being transferred between various electronic devices.

Generally, the larger the amount of data, the longer time is required for the data to be transferred. Many technologies have been developed to speed up data transfer from one device to another. For example, TransferJet technology has been developed for close proximity wireless transfers. In TransferJet technology a touch-activated interface may be used for applications requiring high speed data transfer between two devices in a peer-to-peer mode without a need of external physical connectors.

Unfortunately, while TransferJet speeds up data transfer it requires its associated protocol. Accordingly, data transfer between different electronic devices requires the entire data to be processed by the central processing unit of the device. For example, the data being transferred between a card and an electronic device must first be processed by the processing unit of the electronic device.

Processing data through the processing unit is usually slow because the processing unit must access all data packets, process them and store them in a local memory. In other words, the larger the payload the longer time is required for that data to be processed. Processing by the processing unit of a portable device further slows down when the processing unit accommodates multiple applications in addition to the one transferring data. Operating multiple applications simultaneously requires sharing of the resources of the processing unit between different applications, thereby slowing their respective processing.

Furthermore, processing large amounts of data through the devices central processor consumes excessive power. Power is a valuable commodity, especially in wireless portable electronic devices that rely on batteries. As such, transferring large amounts of data through processing by the processing unit adversely affects the power available to other applications.

SUMMARY

Accordingly, a need has arisen to facilitate data transfer between two electronic components in compliance with for instance, TransferJet technology, without a need to process the entire data, thereby improving the speed of the data transfer. Furthermore, a need has arisen to facilitate data transfer in a power efficient manner. It will become apparent to those skilled in the art in view of the detailed description of the present invention that the embodiments of the present invention remedy the above mentioned needs and provide the above referenced advantages.

According to one embodiment, a processor of an electronic device is operable to process a header portion of data without processing a corresponding payload of the data. Processing the header portion generates a processed header. The processor may signal a direct memory access (DMA) unit to access the payload of the data. As a result, the DMA merely accesses and passes the payload to a wireless interface for transmission to a destination electronic device based on the processed header.

It is appreciated that the processor processing the header portion may be a processor of an electronic device, e.g., a cellular phone, a PDA, etc. It is further appreciated that the processor may be a processor of a removable memory component. In one embodiment, the processor may be a processor of a module adapted to receive a removable memory component and further adapted to be coupled to an electronic device, e.g., a cellular phone, a PDA, etc., where the removable memory component may include its own processor.

As a result of merely processing the header portion of the data instead of the entire data, e.g., the header and the payload, the amount of processing required of the processor is reduced. Thus, the amount of time required to setup the data transfer and to transfer the data is reduced. Moreover, since the amount of processing is also reduced, the amount of power consumption is reduced, thereby improving power efficiency of the electronic device.

More specifically, a wireless electronic device includes a processor, a direct memory access unit, and a wireless interface. The processor is operable to access and process a header portion of data from a removable memory component to generate a processed header without processing a payload of the data. The direct memory access unit is operable to access the payload from the removable memory component responsive to a signal from the processor. The direct memory access unit is further operable to pass the payload to a wireless interface. The wireless interface is operable to receive the payload and the processed header and in response thereto transmit the payload and the processed header to a destination electronic device, e.g., via wireless communication channel.

According to one embodiment, the wireless electronic device further includes a controller operable to control the transmission of the payload and the processed header between the direct memory access unit and the wireless interface. The wireless electronic device may be adapted to further include a card slot operable to receive the removable memory component.

In one embodiment, the protocol for transmitting the processed header and the payload to the destination electronic device is substantially compliant with TransferJet technology. It is appreciated that power consumption is reduced because the payload does not need to be processed. The wireless device may further include a wireless transmitter operable to transmit the processed header and the payload to the destination electronic component.

In another embodiment, a device is adapted to receive a removable memory component and is further adapted to be coupled to a first electronic device, thereby facilitating a data transfer to a second electronic device. According to one embodiment, the device includes a first processor, a direct memory access unit, a controller, a wireless interface, and a wireless transmitter. The direct memory access unit, the controller, the wireless interface and the wireless transmitted operate substantially similar to that of the wireless electronic device described above.

The first processor is operable to facilitate a data transfer to the second electronic device when coupled to the removable memory component and when further coupled to the first electronic device. The first electronic device and the second electronic device each include their own processing unit that is separate from the first processor. The first processor is operable to access and process a header portion of data to generate a processed header without processing a payload of the data.

According to one embodiment, the device further includes a memory card receiver operable to receive the removable memory component. The removable memory component stores the data. It is appreciated that in one embodiment the removable memory component includes a processor.

According to one embodiment, the first processor facilitates the data transfer in response to an initiation by a processor of the first electronic device, wherein the initiation identifies the second electronic device to receive the data. It is appreciated that in one embodiment, the protocol for transmitting the processed header and the payload to the second electronic device is substantially compliant with TransferJet technology. It is appreciated that power consumption is reduced because the payload does not need to be processed.

According to one embodiment, the device further includes a switch operable to toggle between a transfer mode and a direct mode responsive to a user selection. The data from the removable memory component is transmitted to the first electronic device responsive to the switch being in the direct mode. Alternatively, the data is transmitted from the removable memory component to the second electronic device in response to the switch being in the transfer mode.

Another embodiment takes advantage of an already existing processor within a removable memory component. The removable memory component includes a storage medium, a first processor, a direct memory access unit, a controller, a wireless interface, and a wireless transmitter. The direct memory access unit, the controller, the wireless interface and the wireless transmitted operate substantially similar to that of the wireless electronic device described above. The removable memory component may include a switch that operates substantially similar to the switch of the device described above.

The storage medium is operable to store data. The first processor is operable to facilitate a data transfer to a second electronic device when coupled to the first electronic device. It is appreciated that the first and the second electronic devices each include a processing unit that is separate from the first processor. The first processor is operable to access and process a header portion of the data to generate a processed header without processing a payload of the data.

It is appreciated that in one embodiment, the protocol for transmitting the processed header and the payload to the second electronic device is substantially compliant with TransferJet technology. It is appreciated that power consumption is reduced because the payload is not processed by the first processor.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
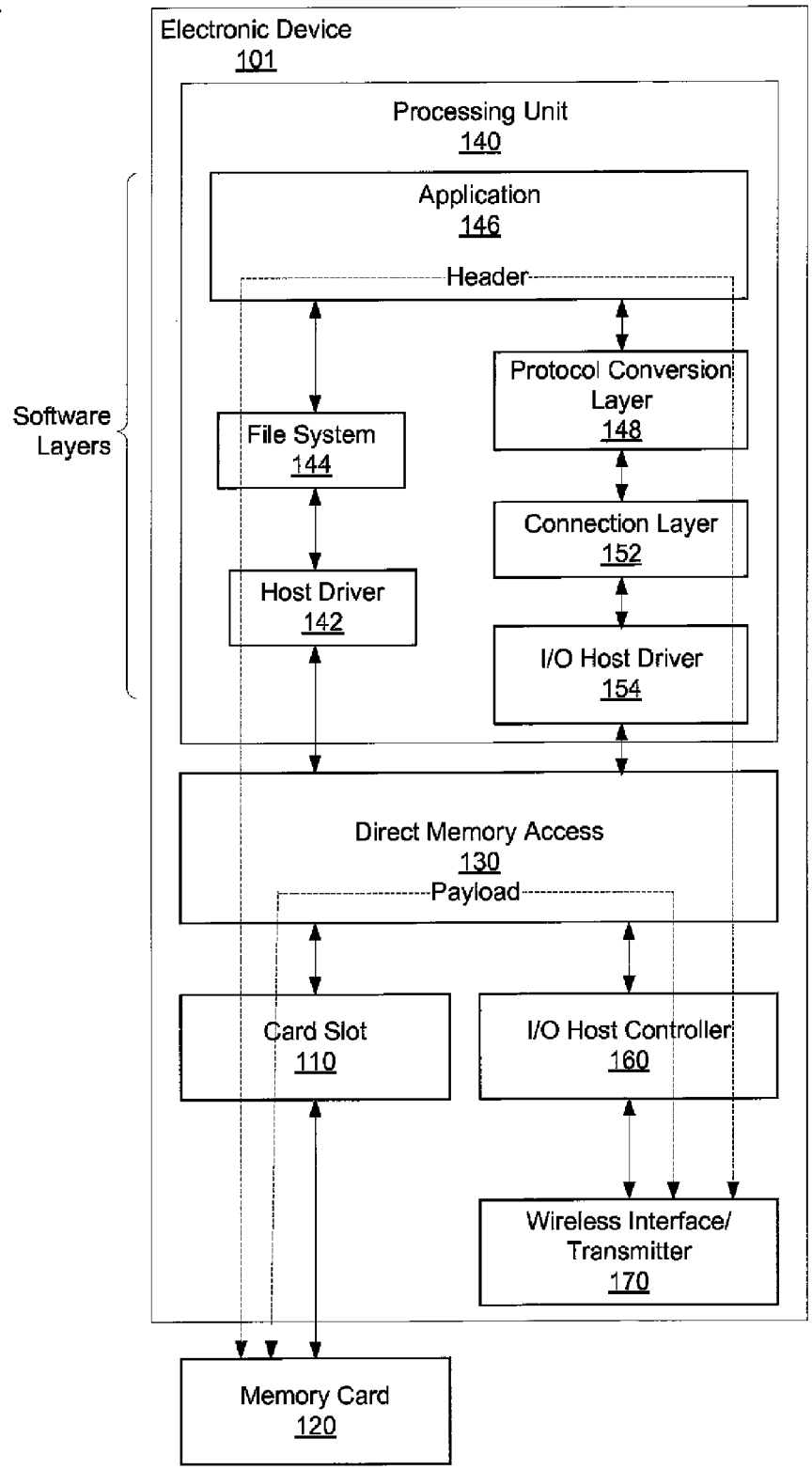
FIG. 1 shows an electronic device in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on television set memory. These descriptions and representations are the means used by those skilled in the art to most effectively convey the substance of their work to others skilled in the art. A procedure, television set executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "altering" or "clearing" or "accessing" or "aggregating" or "obtaining" or "selecting" or "calculating" or "generating" or "measuring" or "querying" or "receiving" or "sending" or "providing" or "storing" or "displaying" or "rendering" or "transmitting" or "detecting" or "prompting" or "changing" or "controlling" or the like, refer to the action and processes of a television set, or similar electronic computing device, that manipulates and transforms data represented as physical (electronic) quantities within the television set's registers and memories into other data similarly represented as physical quantities within the television set memories or registers or other such information storage, transmission or display devices.

A Method and System for Transferring Data Between Wireless Devices

Referring to FIG. 1, an electronic device 101 in accordance with one embodiment of the present invention is shown. The electronic device 101 may be a cellular phone, a PDA, or any other portable electronic device. The electronic device 101 includes a processing unit 140, a direct memory access unit component 130, a card slot 110, an input/output (I/O) host controller 160, and a wireless interface/transmitter 170. The card slot 110 is operable to receive removable memory components, e.g., a memory card 120. It is appreciated that the memory card 120 may include a processor of its own (not shown).

The memory card 120 may store digital data, e.g., audio files, video files, etc. The stored data includes a header portion and a payload portion. The electronic device 101 facilitates a fast data transfer from the memory card 120 to a destination electronic device (not shown). Once the memory card 120 is coupled to the card slot 110, the processing unit 140 accesses the header portion of the data stored on the memory card 120.

The processing unit 140 may execute multiple software applications, e.g., a host driver 142, a phone application, a file system application 144, an application 146, a protocol conversion layer application 148, a connection layer 152, and an I/O host driver 154, etc. The software application being executed by the processing unit 140 process the accessed header portion of the data.

Processing of the header portion generates a processed header. In one embodiment, the processed header may be compliant with TransferJet technology. For example, the protocol layer associated with the original header may be converted into a new protocol layer. It is appreciated that the protocol layer is used in transmitting data. Similarly, the connection layer associated with the original header may be changed. Accordingly, the original accessed header is processed to generate a processed header that is compliant with the TransferJet technology, for instance.

The corresponding payload to the header is not processed by the processing unit 140. It is appreciated that the processing of the header portion instead of the entire data, e.g., header and the payload, reduces the amount of processing by the processing unit 140. As a result, power consumption by the processing unit 140 is reduced. Moreover, the reduction in the amount of processing by the processing unit 140 speeds up the data transfer operation between the memory component 120 and the destination electronic device via the electronic device 101.

Moreover, reducing the amount of processing by the processing unit 140 to setup the data transfer operation reduces the amount of time that the resources of the processing unit 140 require to perform the transfer. As a result, the impact of data transfer on other applications operating simultaneously is reduced.

The processed header portion is transmitted to the wireless interface/transmitter 170 via the I/O host controller 160. During the time in which the processing unit 140 is processing the header portion, the processing unit 140 may signal the direct memory access unit 130 to access the payload stored in the memory card 120. The direct memory access unit 130 passes the accessed payload to the wireless interface/transmitter 170 via the I/O host controller 160 by bypassing the processing unit 140. It is appreciated that the processing unit 140 may signal the direct memory access unit 130 to access the payload stored in the memory card 120 after the processed header is generated by the processing unit 140.

The I/O host controller 160 may control the transmission of the received payload and the received processed header to the wireless interface/transmitter 170. The wireless interface/transmitter 170 is operable to transmit the received payload and the processed header to the destination electronic device associated with the processed header. The data being transmitted by the wireless interface/transmitter 170 may be compliant with the TransferJet technology, in one embodiment. It is appreciated that the wireless interface/transmitter 170 may be two separate components or integrated within one unit, as shown.

Accordingly, because the processing unit 140 only processes the header portion and not the payload, data transfer operations are performed faster, especially for large payloads, e.g., audio information, video, etc. As such, not only is the amount of time for the data transfer reduced, but the amount of power consumed is also reduced. It is appreciated that the description of the operation of data being transferred from the memory card 120 via the electronic device 101 to the destination device is exemplary and not intended to limit the scope of the present invention. For example, a similar process may be employed to transfer data from the destination electronic device via the electronic device 101 to the memory card 120.

Figure 2:
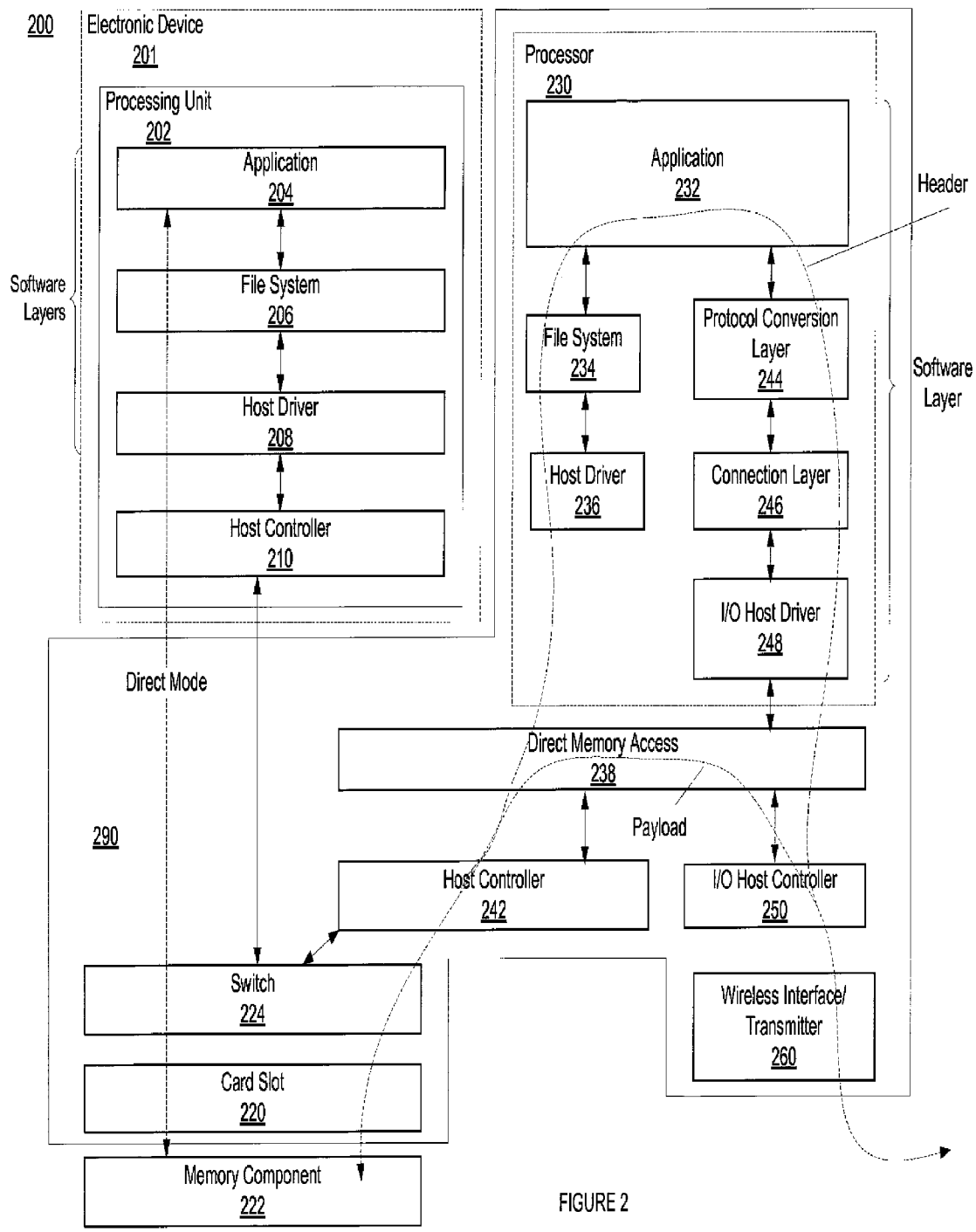
FIG. 2 shows one exemplary add-on module device for facilitating data transfer between two electronic components in accordance with one embodiment of the present invention.

Referring now to FIG. 2, one exemplary add-on module device 290 for facilitating data transfer between two electronic components in accordance with one embodiment of the present invention is shown. The add-on module device 290 enables a rapid transfer of data between a memory card, e.g., memory component 222, and a destination electronic device (not shown) via an electronic device 201. It is appreciated that the memory component 222 may include a processor of its own (not shown).

In one embodiment, the data transfer may be performed in compliance with TransferJet technology. It is appreciated that the electronic device 201 by itself is incapable of transferring data in compliance with TransferJet technology. However, the electronic device 201 becomes TransferJet technology enabled when the add-on module device 290 is coupled to the electronic device 201.

The electronic device 201 may include a processing unit 202 and a host controller 210. The processing unit 202 may execute multiple software applications, e.g., file system 206, host driver 208, etc. It is appreciated that the electronic device 201 is exemplary and not intended to limit the scope of the present invention. As such, the electronic device 201 may include other components (not shown). It is appreciated that the electronic device 201 is operable to receive the add-on module device 290 for enabling data transfer operations in compliance with TransferJet technology.

The add-on module 290 may include a processor 230, a direct memory access component 238, a host controller 242, an I/O host controller 250, a wireless interface/transmitter 260, a switch 224, and a card slot 220. It is appreciated that the processor 230, the direct memory access component 238, the I/O host controller 250, the wireless interface/transmitted 260, and the card slot 220 operate substantially similar to the above description with respect to FIG. 1.

The add-on module device 290 is operable to receive the memory component 222 via its card slot 220. Toggling the switch 224 may initiate a data transfer between the memory component 222 and the electronic device 201, referred to as direct mode. For example, the memory component 222 may be an SD memory component and the switch 224 may indicate the transfer of data between the memory component 222 and the electronic device 201 in SD mode.

In contrast, the switch 224 may be toggled to initiate a data transfer between the memory component 222 and a destination electronic device (not shown) via the add-on module device 290. When the switch 224 is in transfer mode, the host controller 242 controls the flow of data including its header and its payload.

When the switch 224 is in transfer mode, the processing unit 230 may execute multiple software applications, e.g., a host driver 236, a file system application 234, an application 232, a protocol conversion layer 244, a connection layer 246, and an I/O host driver 248. The software applications being executed by the processing unit 230 process the accessed header portion of the data from the memory component 222. It is appreciated that the operation of the processing unit 230 is similar to that of the processing unit 140 described above. Processing of the header portion generates a processed header. In one embodiment, the processed header may be compliant with TransferJet technology.

Processor 202 is relieved from any data transfer operations. Moreover, processor 230 does not process the data payload. It is appreciated that the processing of only the header portion instead of the entire data, e.g., header and the payload, reduces the amount of processing required of the processing unit 230. As a result, power consumption by the processing unit 230 (and the processing unit 202) of the electronic device are reduced. This speeds up the data transfer between the memory component 222 and the destination electronic device.

The processor 202 is relieved from processing information regarding data transfer because the processing is performed by the processing unit 230 instead of the processing unit 202. Thus, the resources of the processor 202 are freed to accommodate other applications of the electronic device 201.

The processor 230 may signal the direct memory access unit 238 to access the payload either during the generation of the processed header or after. The direct memory access unit 238 in response to the signal from the processor 230 accesses the payload and passes the payload to the wireless interface/transmitter 260 via the I/O host controller 250 bypassing the processor 230. The wireless interface/transmitter 260 receives the processed header. The received data by the wireless interface/transmitter 260 is operable for transmission to the destination electronic device where the received data is substantially compliant with TransferJet technology.

Figure 3:
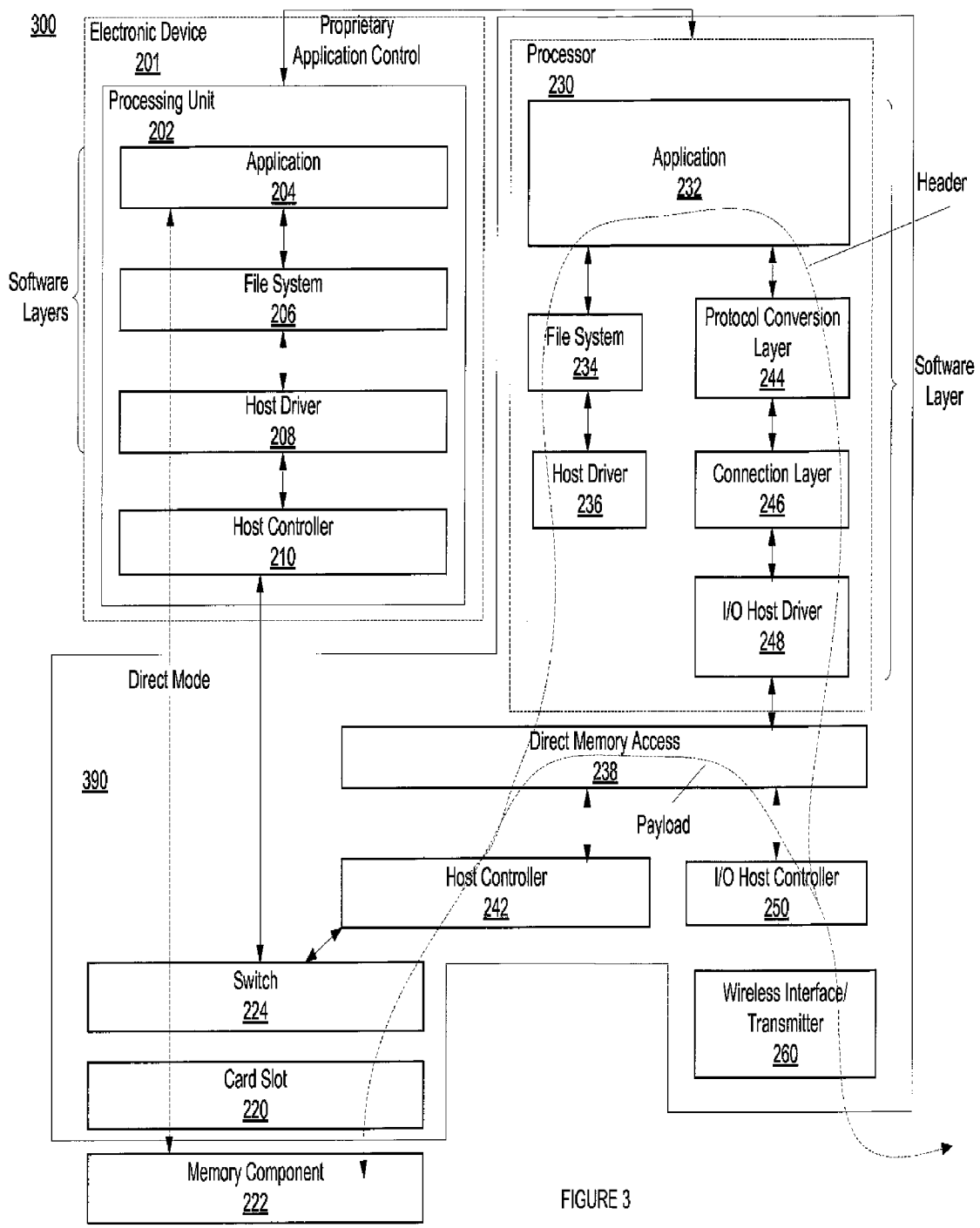
FIG. 3 shows an exemplary add-on module device controlled by an electronic device in accordance with one embodiment of the present invention.

Referring now to FIG. 3, an exemplary add-on module device 390 controlled by an electronic device in accordance with one embodiment of the present invention is shown. It is appreciated that the add-on module device 390 operates substantially similar to that of FIG. 2. However, in this embodiment, the processing unit 202 of the electronic device 201 may control the initial operation of the processor 230 via application control signals. For example, the processing unit 202 may identify the destination electronic device and initiate a data transfer setup operation by the processing unit 230, etc. However, the actual setup and the actual transfer of data is performed by the add-on module 390.

Figure 4:
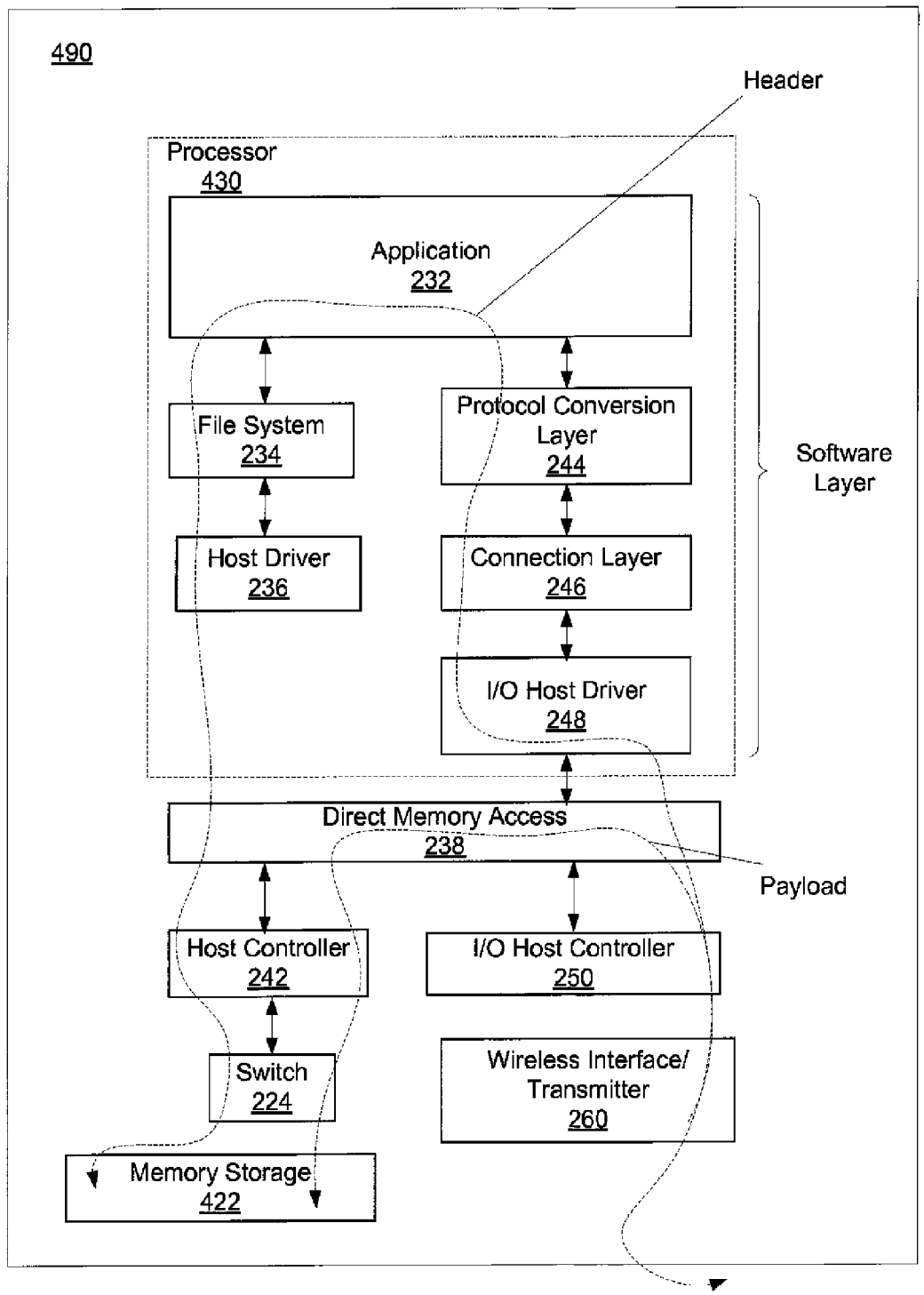
FIG. 4 shows an exemplary removable memory component in accordance with one embodiment of the present invention.

Referring now to FIG. 4, an exemplary removable memory component 490 in accordance with one embodiment of the present invention is shown. The removable memory component 490 enables a rapid transfer of data between a memory component 490 and a destination electronic device (not shown) via an electronic device (not shown). In one embodiment, the rapid transfer of data may be in compliance with TransferJet technology. It is appreciated that an electronic device by itself may be incapable of transferring data in compliance with TransferJet technology. However, the electronic device becomes TransferJet enabled when the removable memory component 490 is coupled to the electronic device.

In this embodiment, a processor 430 that belongs to the memory component 490 is used to setup data transfer and to transfer data instead of utilizing a dedicated processor 230 of the add-on module devices 290 and 390 or the processor of the electronic device, e.g., processor 140. As a result, a need to use an additional processor, e.g., processor 230 or the processor 140 of the electronic device, is eliminated. In other words, the already existing processor 430 of the memory component 490 may be used to setup data transfer and to transfer data. For example, the processor 430 may be used to process the header of the data stored in a memory storage 422.

According to one embodiment, the removable memory component 490 includes the processor 430, the memory storage 422, the switch 224, the host controller 242, the direct memory access unit 238, the I/O host controller 250, and the wireless interface/transmitter 260. It is appreciated that the processor 430, the switch 224, the host controller 242, the direct memory access unit 238, the I/O host controller 250, and the wireless interface/transmitter 260 operate substantially similar to that described with respect to FIGS. 2 and 3.

It is appreciated that merely processing of the header portion instead of the entire data, e.g., header and the payload, reduces the amount of work required of the processor to perform the data transfer. As a result, power consumption by the processing unit 430 and the processing unit of the electronic device are reduced.

Moreover, the reduction in processing required of the processing unit 430 speeds up the data transfer between the memory component 490 and the destination electronic device. It is appreciated that using the existing processor of the removable memory component 490 instead of using a dedicated processor, as described above with respect to the add-on module device, reduces overall system cost by eliminating unnecessary components.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A wireless electronic device comprising:
    a processor operable to access and process a header portion of data from a memory component to generate a processed header without processing a payload of said data;
    a direct memory access unit operable to access said payload from said memory component responsive to a signal from said processor, and wherein said direct memory access unit is further operable to pass said payload to a wireless interface; and
    said wireless interface operable to receive said payload and said processed header and in response thereto transmit said payload and said processed header to a destination electronic device;
    wherein a protocol associated with said processed header for transmitting data is different from a protocol associated with said header portion.

2. The wireless device as described in claim 1 further comprising:
    a controller operable to control transmission of said payload and said processed header between said direct memory access unit and said wireless interface.

3. The wireless electronic device as described in claim 1 further comprising:
a card slot operable to receive said memory component.

4. The wireless electronic device as described in claim 1, wherein transmission of said processed header and said payload to said destination electronic device is substantially compliant with TransferJet technology.

5. The wireless electronic device as described in claim 1 further comprising:
a wireless transmitter operable to transmit said processed header and said payload to said destination electronic component.

6. A device comprising:
a first processor operable to facilitate a data transfer to a second electronic device when coupled to a memory component and when further coupled to a first electronic device, wherein said first electronic device and said second electronic device each comprise a processing unit separate from said first processor, and wherein said first processor is operable to access and process a header portion of data to generate a processed header without processing a payload of said data;
a direct memory access unit operable to access said payload responsive to a signal from said first processor, and wherein said direct memory access unit is further operable to pass said payload to a wireless interface; and
said wireless interface operable to receive said payload and said processed header and in response thereto transmit said payload and said processed header to said second electronic device.

7. The device as described in claim 6 further comprising:
a memory card receiver operable to receive said removable memory component comprising said data.

8. The device as described in claim 6 further comprising:
a controller operable to control transmission of said payload and said processed header between said direct memory access unit and said wireless interface.

9. The device as described in claim 6, wherein said first processor facilitates said data transfer in response to an initiation by a processor of said first electronic device, wherein said initiation identifies said second electronic device to receive said data.

10. The device as described in claim 6, wherein transmission of said processed header and said payload to said second electronic device is substantially compliant with TransferJet technology.

11. The device as described in claim 6 further comprising:
a wireless transmitter operable to transmit said processed header and said payload to said second electronic device.

12. The device as described in claim 6 further comprising:
a switch operable to toggle between a transfer mode and a direct mode, wherein the switch being in the transfer mode permits the data to be transmitted to the second electronic device using both the first processor to access and process the header portion to generate the processed header and the direct memory access unit to pass the payload.

13. The device as described in claim 12, wherein said data is transmitted from said memory component to said second electronic device in response to said switch being in said transfer mode.

14. The device as described in claim 6, wherein a protocol associated with said processed header for transmitting data is different from a protocol associated with said header portion.

15. A memory component comprising:
a storage medium operable to store data;
a first processor operable to facilitate a data transfer to a second electronic device when coupled to a first electronic device, wherein said first electronic device and said second electronic device each comprise a processing unit separate from said first processor, and wherein said first processor is operable to access and process a header portion of said data to generate a processed header without processing a payload of said data;
a direct memory access unit operable to access said payload responsive to a signal from said first processor, and wherein said direct memory access unit is further operable to pass said payload to a wireless interface; and
said wireless interface operable to receive said payload and said processed header and in response thereto transmit said payload and said processed header to said second electronic device, wherein a protocol associated with the processed header is different from a protocol associated with the header portion.

16. The memory component as described in claim 15 further comprising:
a controller operable to control transmission of said payload and said processed header between said direct memory access unit and said wireless interface.

17. The memory component as described in claim 15, wherein transmission of said processed header and said payload to said second electronic device is substantially compliant with TransferJet technology.

18. The memory component as described in claim 15 further comprising:
a wireless transmitter operable to transmit said processed header and said payload to said second electronic device.

19. The memory component as described in claim 15 further comprising:
a switch operable to toggle between a transfer mode and a direct mode, wherein the switch being in the transfer mode permits the data to be transmitted to the second electronic device using both the first processor to access and process the header portion to generate the processed header and the direct memory access unit to pass the payload.

20. The wireless electronic device as described in claim 1 further comprising:
a switch operable to toggle between a transfer mode and a direct mode, wherein the switch being in the transfer mode permits the data to be transmitted to the destination electronic device using both the processor to access and process the header portion to generate the processed header and the direct memory access unit to pass the payload.

* * * * *